US012766826B2

(12) United States Patent
Murase et al.

(10) Patent No.: US 12,766,826 B2
(45) Date of Patent: Oct. 20, 2026

(54) RECORDING APPARATUS, CONTROL METHOD, AND PROGRAM

(71) Applicant: CANON KABUSHIKI KAISHA, Tokyo (JP)

(72) Inventors: Takeshi Murase, Kanagawa (JP); Kazuo Suzuki, Kanagawa (JP); Masataka Kato, Kanagawa (JP); Masaki Nitta, Kanagawa (JP); Hiroshi Taira, Tokyo (JP); Hiroshi Kawafuji, Tokyo (JP); Sae Mogi, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 355 days.

(21) Appl. No.: 18/464,990

(22) Filed: Sep. 11, 2023

(65) Prior Publication Data

US 2023/0415474 A1 Dec. 28, 2023

Related U.S. Application Data

(63) Continuation of application No. PCT/JP2022/008827, filed on Mar. 2, 2022.

(30) Foreign Application Priority Data

Mar. 12, 2021 (JP) ................................ 2021-040473

(51) Int. Cl.

| | |
|---|---|
| ***B41J 2/045*** | (2006.01) |
| ***B41J 2/03*** | (2006.01) |
| ***B41J 2/21*** | (2006.01) |
| ***B41J 11/00*** | (2006.01) |
| ***B41J 25/00*** | (2006.01) |

(52) U.S. Cl.
CPC ............ *B41J 2/03* (2013.01); *B41J 2/04541* (2013.01); *B41J 2/04563* (2013.01); *B41J 2/21* (2013.01); *B41J 11/007* (2013.01); *B41J 25/001* (2013.01); *B41J 2002/033* (2013.01)

(58) Field of Classification Search
CPC .............................. B41J 2/04553; B41J 2/045
See application file for complete search history.

(56) References Cited

U.S. PATENT DOCUMENTS

| | | | | |
|---|---|---|---|---|
| 6,154,229 | A | 11/2000 | Corrigan | |
| 2003/0048317 | A1* | 3/2003 | Usui | B41J 29/393 347/14 |
| 2003/0132981 | A1* | 7/2003 | Arakawa | B41J 2/04581 347/19 |
| 2005/0195230 | A1 | 9/2005 | Kanematsu et al. | |
| 2006/0028523 | A1* | 2/2006 | Hoshino | B41J 11/00216 347/102 |
| 2011/0261104 | A1 | 10/2011 | Tatsumi | |

(Continued)

FOREIGN PATENT DOCUMENTS

| | | | |
|---|---|---|---|
| JP | 2002246641 | A | 8/2002 |
| JP | 2005035080 | A | 2/2005 |

(Continued)

*Primary Examiner* — Scott A Richmond
(74) *Attorney, Agent, or Firm* — Canon U.S.A., Inc. IP Division

(57) ABSTRACT

A threshold value is set based on a temperature of a recording apparatus, and a recording condition corresponding to the acquired temperature is set by comparing the set threshold value with a counted value of the number of driving times of a recording element.

14 Claims, 14 Drawing Sheets

(56) References Cited

U.S. PATENT DOCUMENTS

| | | | | |
|---|---|---|---|---|
| 2017/0348979 | A1* | 12/2017 | Umeda ................ | B41J 2/04535 |
| 2019/0299592 | A1 | 10/2019 | Iwasaki et al. | |

FOREIGN PATENT DOCUMENTS

| | | | |
|---|---|---|---|
| JP | 2005224955 | A | 8/2005 |
| JP | 2005246641 | A | 9/2005 |
| JP | 2009056669 | A | 3/2009 |
| JP | 2011230302 | A | 11/2011 |
| JP | 2015217632 | A | 12/2015 |
| JP | 2017177646 | A | 10/2017 |
| JP | 2017213874 | A | 12/2017 |
| JP | 2019006041 | A | 1/2019 |
| JP | 2019177608 | A | 10/2019 |

* cited by examiner

FIG.7A

| SHEET TYPE | RECORDING QUALITY | NUMBER OF PASSES | CR SPEED | HDth |
|---|---|---|---|---|
| PLAIN PAPER | FINE | 4 | 20 ips | 2304000 |
| PLAIN PAPER | STANDARD | 1 | 40 ips | 1152000 |
| PLAIN PAPER | HIGH SPEED | 1 | 60 ips | 768000 |

FIG.7B

| ENVIRONMENTAL TEMPERATURE | HDthRatio |
|---|---|
| ~ 5°C | 0.5 |
| 5°C ~ 15°C | 0.8 |
| 15°C ~ 25°C | 1.0 |
| 25°C ~ 35°C | 1.2 |
| 35°C ~ | 1.3 |

FIG.9

| SHEET TYPE | RECORDING QUALITY | CONDITION 1 | | CONDITION 2 | | CONDITION 3 |
|---|---|---|---|---|---|---|
| | | DownTh1 | RECORDING METHOD | DownTh2 | RECORDING METHOD | RECORDING METHOD |
| PLAIN PAPER | FINE | 1.5 | CR SPEED × 0.6 | — | — | CR SPEED × 0.8 |
| PLAIN PAPER | STANDARD | 2 | CR SPEED × 0.6 TWO-DIVISION RECORDING | 1.5 | CR SPEED × 0.6 | CR SPEED × 0.8 |
| PLAIN PAPER | HIGH SPEED | 2 | CR SPEED × 0.6 TWO-DIVISION RECORDING | 1.5 | CR SPEED × 0.6 | CR SPEED × 0.8 |

FIG.13A

| SHEET TYPE | RECORDING QUALITY | NUMBER OF PASSES | CR SPEED | HDth | HDth_narrow |
|---|---|---|---|---|---|
| PLAIN PAPER | FINE | 4 | 20 ips | 2304000 | 115200 |
| PLAIN PAPER | STANDARD | 1 | 40 ips | 1152000 | 57600 |
| PLAIN PAPER | HIGH SPEED | 1 | 60 ips | 768000 | 38400 |

FIG.13B

| ENVIRONMENTAL TEMPERATURE | HDthRatio |
|---|---|
| ~ 5°C | 0.5 |
| 5°C ~ 15°C | 0.8 |
| 15°C ~ 25°C | 1.0 |
| 25°C ~ 35°C | 1.2 |
| 35°C ~ | 1.3 |

RECORDING APPARATUS, CONTROL METHOD, AND PROGRAM

CROSS-REFERENCE TO RELATED APPLICATIONS

This application is a Continuation of International Patent Application No. PCT/JP2022/008827, filed Mar. 2, 2022, which claims the benefit of Japanese Patent Application No. 2021-040473, filed Mar. 12, 2021, both of which are hereby incorporated by reference herein in their entirety.

BACKGROUND OF THE INVENTION

Field of the Invention

The present invention relates to a recording apparatus that records an image on a recording medium, a control method, and a program.

Background Art

A so-called inkjet recording head, which records an image by ejecting ink droplets to provide dots on a recording medium, is known as a recording head used in a recording apparatus. In a recording apparatus equipped with an inkjet recording head, ink is supplied from an ink tank through a supply flow path, and an image is recorded by controlling the recording head based on image data specified by a user.

Depending on image data transmitted from a host computer, density of dots to be recorded is not uniform, and power required to drive a recording element for ejecting ink droplets can vary depending on an area. In order to always ensure constant productivity without considering such variation of power, it is necessary to deal with a case where the dot density to be recorded is maximum. As a result, it is necessary to include a large-capacity power supply and a circuit that can withstand input and output of the large-capacity power supply. Further, in order to meet a demand for faster recording, recording elements provided in a recording head become denser and longer. Accordingly, there is an issue that the power used in the recording head increases.

According to the patent literature 1, a configuration is discussed which measures the number of driving times of a recording element in an area where an image is to be recorded, and in a case where the number of driving times is greater than a predetermined threshold value, decelerates a carriage on which a recording head is mounted or divides the scan of the recording performed on the area into a plurality of scans. In this way, recording data is analyzed before a recording operation, and thus it is possible to reduce power consumed by the recording head and to suppress a decrease in throughput while making the most of a fixed power supply capacity of the apparatus.

CITATION LIST

Patent Literature

PTL 1: Japanese Patent Application Laid-Open No. 2005-224955

However, according to the technique discussed in the patent literature 1, a temperature in an installation environment of a recording apparatus is not considered.

SUMMARY OF THE INVENTION

The present invention is directed to determination of a recording condition based on a temperature in an installation environment of a recording apparatus. According to an aspect of the present invention, a recording apparatus that records an image on a recording medium by applying an ink droplet thereto includes an acquisition unit configured to acquire a temperature in an installation environment of the recording apparatus, a recording head provided with a plurality of recording elements to be driven by application of electrical energy, a scanning unit configured to cause the recording head to relatively scan a recording medium, a setting unit configured to set a threshold value corresponding to the temperature acquired by the acquisition unit in response to a recording instruction, a calculation unit configured to calculate a value related to driving of the plurality of recording elements for applying ink droplets to a predetermined area in one relative scan based on the recording instruction, a determination unit configured to determine a recording condition for recording an image based on the threshold value set by the setting unit and the value related to driving calculated by the calculation unit, and a control unit configured to control the recording head and the scanning unit based on the recording condition determined by the determination unit.

Further features of the present invention will become apparent from the following description of exemplary embodiments with reference to the attached drawings.

BRIEF DESCRIPTION OF THE DRAWINGS

FIG. 7A illustrates a recording mode table and a threshold value change ratio table of an environmental temperature.

FIG. 7B illustrates a recording mode table and a threshold value change ratio table of an environmental temperature.

FIG. 9 illustrates a recording method in which a power consumption amount is reduced.

FIG. 13A illustrates a recording mode table and a threshold value change ratio table of an environmental temperature.

FIG. 13B illustrates a recording mode table and a threshold value change ratio table of an environmental temperature.

DESCRIPTION OF THE EMBODIMENTS

First Exemplary Embodiment

An exemplary embodiment of the present invention will be described in detail below with reference to the drawings.

<Outline of Entire Apparatus>

Figure 1A:
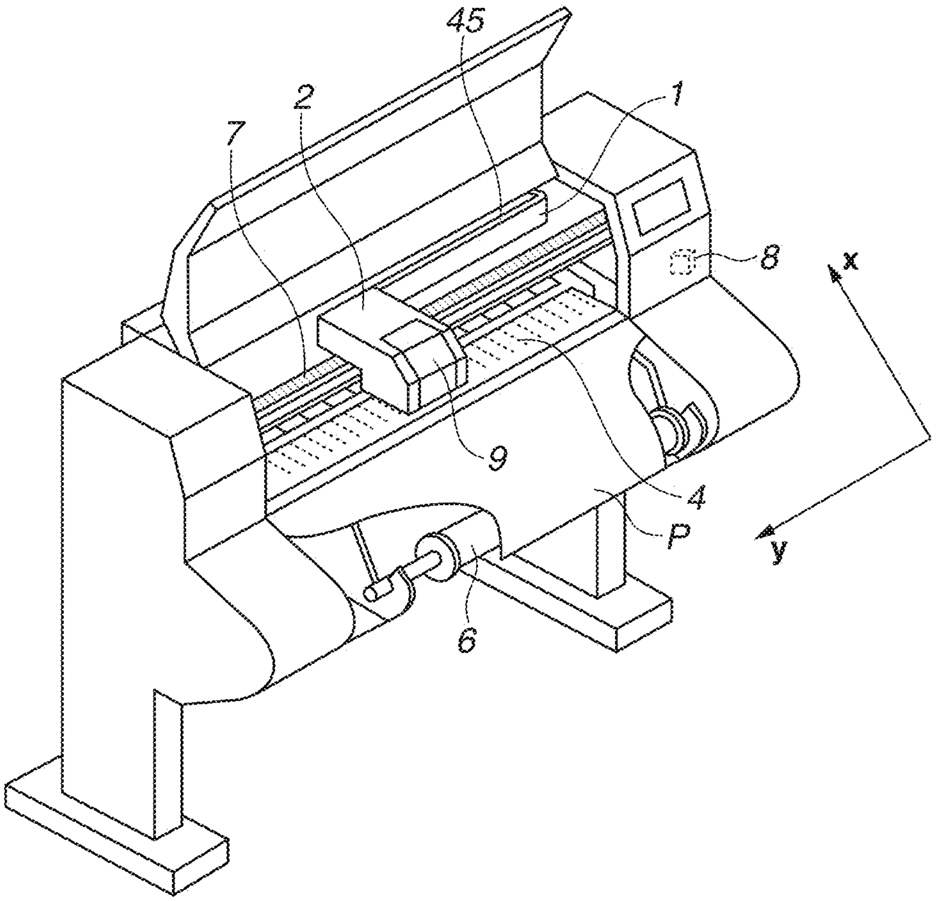
FIG. 1A is a schematic diagram illustrating a recording apparatus.

FIG. 1A is an external view of an inkjet recording apparatus (hereinbelow, also referred to as an image recording apparatus) according to the present exemplary embodiment. The inkjet recording apparatus according to the present exemplary embodiment is a so-called serial scan type image recording apparatus, and a carriage on which a recording head is mounted performs a scan in a Y direction intersecting an X direction in which a recording medium P is conveyed. During the scan, a recording element provided in a recording bead 9 is driven to apply an ink droplet, and an image is recorded on the recording medium P. In the drawing, the X direction is a direction in which the recording medium P is conveyed, the Y direction is a direction in which the carriage performs a scan, and a Z direction is a direction intersecting the X direction and the Y direction.

A configuration of the image recording apparatus and an outline of operations in recording are described with reference to FIGS. 1A and 1B. First, from a state in which the recording medium P is held by a spool 6, a sheet feeding roller is driven by a sheet feeding motor (not illustrated) via a gear, and the recording medium Pis fed and conveyed to a position at which the recording head 9 can perform recording. Meanwhile, at a predetermined conveyance position, a carriage motor (not illustrated) causes a carriage unit 2 on which the recording head 9 is mounted to scan along a guide shaft 29 extending in the Y direction in the drawing. The recording head 9 is detachably mounted on the carriage unit 2. Then, during execution of one scan, the recording element provided in the recording head 9 is driven at a timing based on a position signal acquired by an encoder 7. The recording element is driven, and thus an ink droplet is ejected from an ejection port (a nozzle) and lands on the recording medium P. An image can be recorded in an area corresponding to an arrangement range of the recording element provided in the recording head 9 in one scan of the recording head 9. A recording width corresponding to the arrangement range of the recording element is referred to as a band width. According to the present exemplary embodiment, a scan speed of the carriage unit 2 is 40 inches per second, and recording resolution is 1200 dots per inch, that is 1200 dpi (dots/inch).

After one scan, the recording medium P is conveyed by a predetermined amount in the X direction. Then, an image is recorded in an area for a next band width in the next scan. The image recording apparatus may perform conveyance for the band width, that is the arrangement range of the recording element during each scan, or may convey the recording medium P not for each scan but after a plurality of scans. In addition, a method (referred to as so-called multipass recording) may be adopted in which ink is applied based on thinned out data in n scans, conveyance is repeated with a width of 1/n band between each scan, and thus an image is completed by using different recording elements for recording in the same area.

Details will be described below with reference to FIG. 1B, but a plurality of recording elements for ejecting ink is arranged in the X direction of the drawing in the recording head 9 according to the present exemplary embodiment. A flexible wiring board 1 is attached to the recording head 9 for supplying a signal pulse for driving each recording element and a signal for head temperature control, and the other end of the flexible wiring board 1 is connected to a control circuit for controlling the image recording apparatus.

A carriage belt can be used to transmit a driving force from the carriage motor to the carriage unit 2. Instead of the carriage belt, another drive method can be used, for example, the one provided with a lead screw, which is rotationally driven by the carriage motor and extends in a main scanning direction, and an engaging portion, which is provided in the carriage unit 2 and engages with a groove of the lead screw.

The fed and conveyed recording medium P is pinched and conveyed between the sheet feeding roller and a pinch roller and is guided to a recording position on a platen 4, that is, a main scanning area of the recording head 9. Since a face plane of the recording head 9 is capped in a resting state, a cap is opened before recording to set the recording head 9 or the carriage unit 2 to a scannable state. Then, if recording data for one scan is accumulated in a buffer, the carriage motor 3 causes the carriage unit 2 to scan, and an image is recorded on the recording medium P as described above.

In the drawing, an environmental temperature/humidity sensor 8 is indicated by a dashed line. In general, the environmental temperature/humidity sensor 8 is arranged at a position away from members to be a vibration source and a heat source such as a motor and a heater in order to eliminate an error and measurement noise. Originally, it is installed at a position that is difficult to see, such as a back side of the apparatus, but in the present specification, it is illustrated in a transparent form for the sake of description.

Figure 1B:
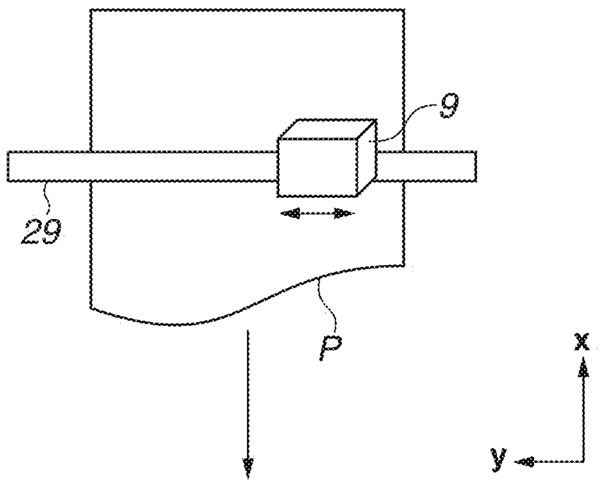
FIG. 1B is a schematic diagram illustrating the recording apparatus.

FIG. 1B is a schematic diagram illustrating the recording medium P and an operation of the recording head in a serial scan method recording apparatus, in which the recording head 9 and the recording medium P are viewed from above. An operation of a serial recording method is described with reference to the drawing. The recording head 9 mounted on the carriage unit 2 is driven by the carriage motor 3 and performs scans back and forth in a width direction (the Y direction) perpendicular to a conveyance direction (the X direction) of the recording medium P. As described above, the image recording apparatus using the serial recording method can perform multipass recording in which the different recording elements eject ink droplets to the same area by relative scanning of the recording head 9 and the recording medium P. The multipass recording can suppress density unevenness due to a variation in a recording characteristic of each recording element.

<Recording Head Configuration>

Figure 2A:
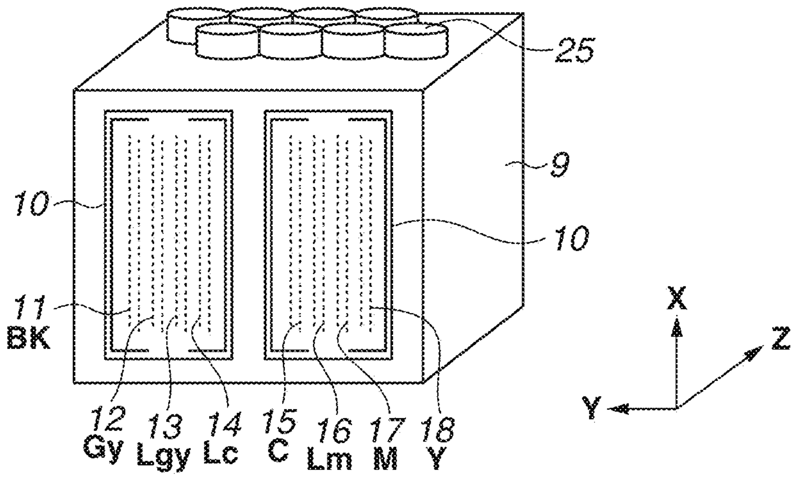
FIG. 2A is an external schematic diagram of a recording head and a plan view of an ejection element substrate.
Figure 2B:
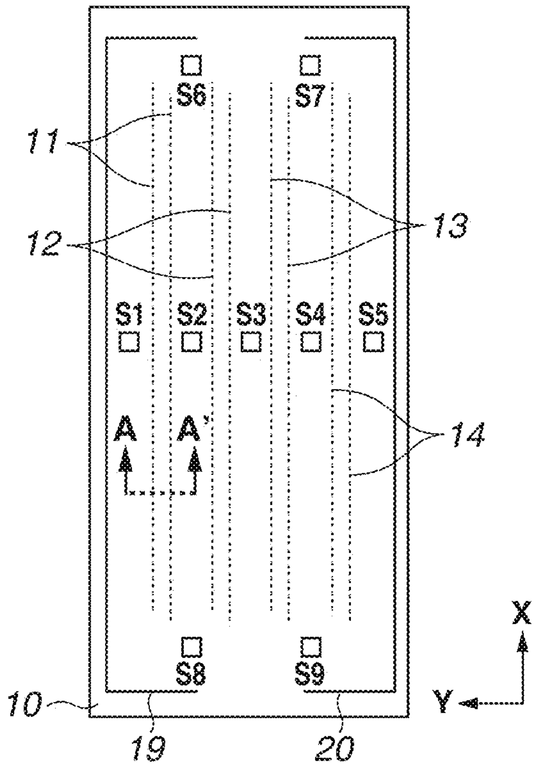
FIG. 2B is an external schematic diagram of the recording head and a plan view of the ejection element substrate.
Figure 2C:
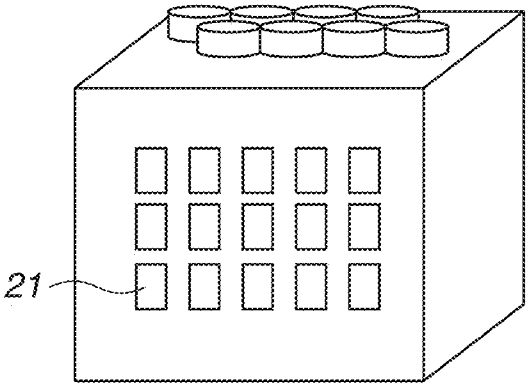
FIG. 2C is an external schematic diagram of the recording head and a schematic perspective view of a connection portion between the apparatus and the head on the back side in FIG. 2A.

FIGS. 2A, 2B, and 2C are schematic diagrams illustrating a configuration of the recording head 9. FIG. 2A is a schematic perspective view from a direction in which ink is ejected. FIG. 2B is an enlarged view of a portion of a recording element substrate on the left side in FIG. 2A, and FIG. 2C is a schematic perspective view of a connection portion between the apparatus and the head on the back side in FIG. 2A.

In FIG. 2A, two recording element substrates 10 are arranged side by side on the recording head 9. A plurality of recording element arrays 11 to 14 capable of ejecting black (Bk), gray (Gy), light gray (Lgy), and light cyan (Lc) inks is arranged on one of the recording element substrates. A plurality of recording element arrays 15 to 18 capable of ejecting cyan (C), light magenta (Lm), magenta (M), and yellow (Y) inks is arranged on the other recording element substrate. Ink is supplied to each recording element array from an ink common liquid chamber 26 described below through an ink flow path inside the recording head 9.

FIG. 2B is a plan view illustrating a detailed configuration of the recording element substrate 10. This is the recording element substrate on which the recording element arrays 11 to 14 are arranged, of the two recording element substrates arranged side by side on the recording head 9. According to the present exemplary embodiment, two recording element arrays are provided for each ink color. Each recording element array is provided with 256 recording elements at a pitch of 600 dpi in the X direction and further is shifted by half the pitch, i.e., 1200 dpi, with respect to facing recording element array, and a total of 512 recording elements are arranged for each color. An ejection port is formed in each recording element, and an ink droplet is ejected from the ejection port by driving of the recording element. Temperature sensors S6, S7, S8, and S9, which are diode sensors, are arranged at an end portion of the recording element substrate 10 in the X direction, and can detect a temperature of the recording element substrate 10. The temperature sensors S6 to S9 are arranged at positions about 0.2 mm apart in a sub-scanning direction from an outermost ejection port position of the recording element array and at intermediate positions between two recording element arrays in the Y direction. At center portions of the recording element arrays in the X direction, temperature sensors S1, S2, S3, S4, and S5, which are formed with diode, for detecting a temperature at the center portions of the recording element arrays are formed, and these sensors are also arranged in the intermediate positions sandwiched between the two recording element arrays.

Sub heaters 19 and 20 for maintaining a temperature of the recording head 9 are formed to surround the recording element substrate 10 and are located 1.2 mm outside the outermost recording element array in the Y direction and 0.2 mm outside the temperature sensor in the X direction.

Connection between the recording head 9 and a main body is described with reference to FIG. 2C. The recording head and the main body of the apparatus are electrically connected via contact pads 21 and the flexible wiring board 1 in FIG. 1A. Electrical signals for controlling ejection of an ink droplet and heat retention and power to be consumed by the recording head are supplied to the recording head via the contact pads. For the connection, a configuration may be provided in which a receiving mechanism such as a pin for fixing is provided on a main body side, and the recording head is fixed by being pressed against the main body of the apparatus, and thus stably connected. A power supply for supplying power used for an ejection operation and a power supply for supplying power used for heat retention may be individually provided with pin wiring, or may be provided with common wiring. If a voltage value used for ejection and a voltage value used for heat retention are the same, the number of terminals can be reduced by sharing the pin wiring. Even in a case where the voltages are different, the wiring can be shared by providing a constant voltage output electronic circuit on the recording head side. A wiring configuration for electrical connection is not limited to the above-described one.

Figure 3:
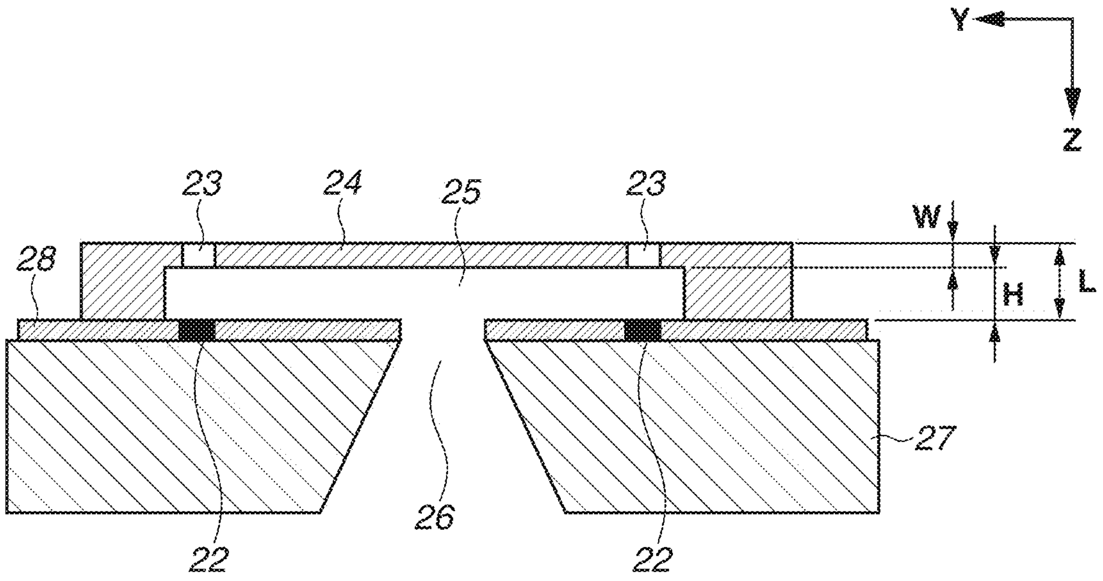
FIG. 3 is a cross-sectional view of the ejection element substrate.

FIG. 3 is a cross-sectional view along a line A-A' in FIG. 2B. In the drawing, a support substrate 27, recording elements 22, and ejection ports 23 are illustrated. An ink flow path 24 as a flow path is formed between the support substrate 27 and an orifice plate 28, and partition walls (not illustrated) are provided between a plurality of the flow paths 24. The recording element 22 according to the present exemplary embodiment is an electrothermal conversion element that converts electrical energy into thermal energy to generate heat. The recording element 22 is provided on the support substrate 27 to face the ink ejection port 23, and a protective film or the like is formed on a surface of the recording element 22. Ink is supplied to each flow path 24 via a common liquid chamber 26 communicating with each flow path 24 from below in FIG. 3.

<Configuration Example of Control System>

Figure 4:
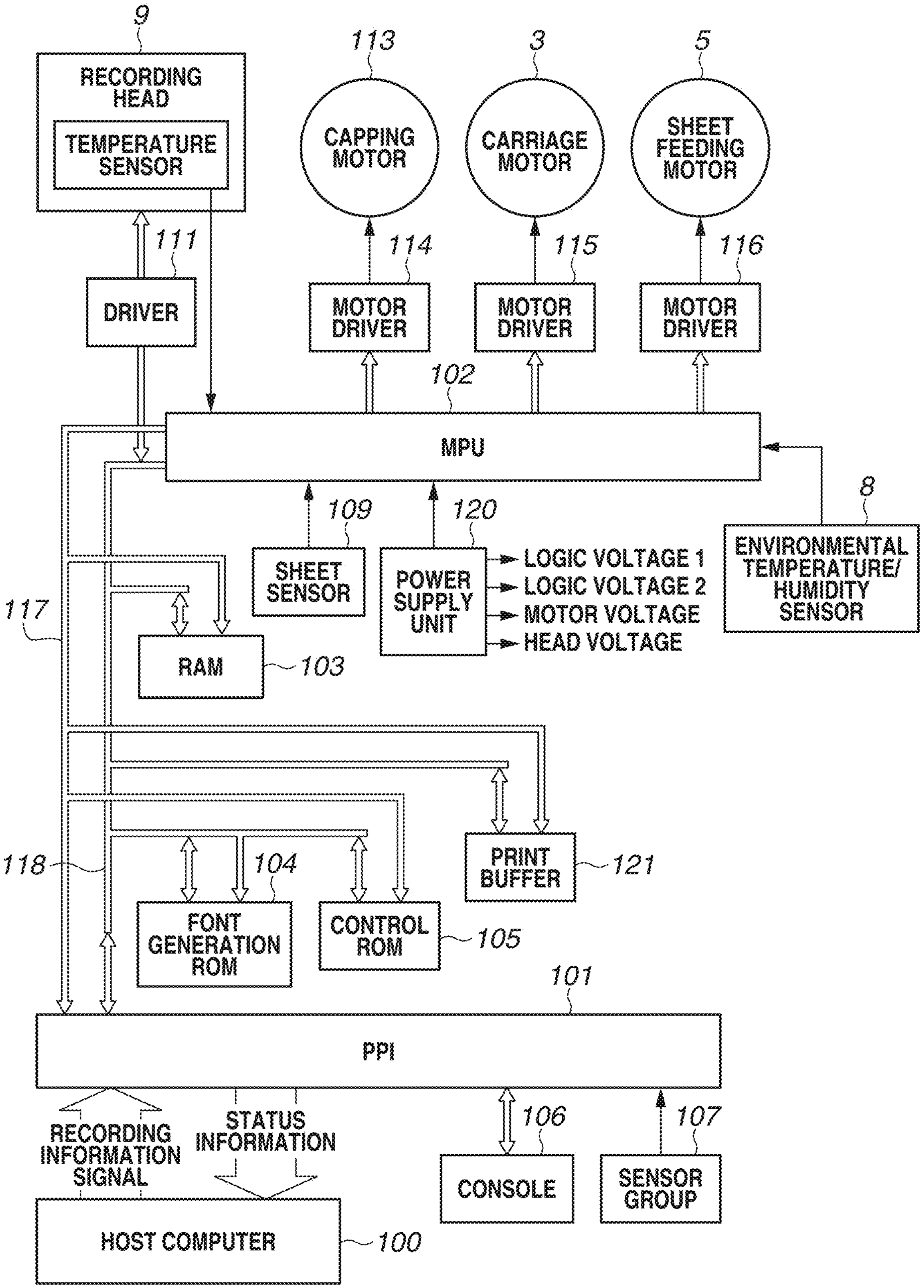
FIG. 4 is a configuration diagram of a control circuit of the recording apparatus.

FIG. 4 illustrates an example of a control circuit of the image recording apparatus. A programmable peripheral interface (hereinbelow referred to as PPI) 101 receives an instruction signal (a command) transmitted from a host computer 100 and a recording information signal including recording data and transfers them to a micro processing unit (MPU) 102. At the same time, the PPI 101 transmits status information of the image recording apparatus to the host computer 100 as necessary. The PPI 101 also performs input and output of data with a console 106, which includes a setting input unit for a user to perform various settings to the image recording apparatus and a display unit for displaying a message to the user. The PPI 101 also receives a signal input from a sensor group 107 including a home position sensor for detecting that the carriage unit 2 or the recording head 9 is at a home position, and a capping sensor.

The MPU 102 controls each unit in the image recording apparatus according to a control program stored in a control read-only memory (ROM) 105. A random access memory (RAM) 103 stores a received signal, is used as a work area for the MPU 102, and also temporarily stores various kinds of data. A print buffer 121 is a memory area that stores recording data loaded to the RAM 103 and the like, and has a capacity for recording a plurality of lines. In addition to the above-described control program, the control ROM 105 can store fixed data corresponding to data used in a process of control (for example, data for determining a combination of temperature sensors related to a main part of the present exemplary embodiment), which will be described below. Each unit is controlled by the MPU 102 via an address bus 117 and a data bus 118.

Motor drivers 114, 115, and 116 are motor drivers for driving a capping motor 113, the carriage motor 3, and a sheet feeding motor 5, respectively, in response to control by the MPU 102.

A sheet sensor 109 detects presence or absence of a recording medium, that is, whether the recording medium is supplied to a position at which the recording head 9 can perform recording. A driver 111 is a driver for driving the recording elements of the recording head 9 according to a recording information signal. The environmental temperature/humidity sensor 8 detects an environmental temperature and environmental humidity in an installation environment of the recording apparatus main body as described above. There is no restriction on a place where the environmental temperature/humidity sensor 8 is installed, as long as it can detect an ambient temperature of the apparatus.

A power supply unit 120 is a power supply unit that supplies power to each of the above-described units, and includes an alternate current (AC) adapter and a battery as a driving power supply device. The power supply unit 120 according to the present exemplary embodiment serves both to supply power for ejecting ink droplets from the recording elements of the recording head 9 and to supply power to the sub-heaters for heat retention.

In a recording system including the image recording apparatus and the host computer 100, in a case where recording data is transmitted from the host computer 100 via a parallel port, an infrared port, a network, or the like, a required command is added to the beginning of the recording data. The command includes, for example, a type of a recording medium on which recording is performed, a medium size, a recording quality, and presence or absence of automatic object discrimination. Types of recording media include, for example, plain paper, an overhead projector (OHP) sheet, glossy paper, and special recording media such as a transfer film, cardboard, and banner paper. Media sizes include A0, A1, A2, B0, B1, and B2 sizes. The recording quality includes draft, high quality, medium quality, specific color emphasis, and monochrome/color. In a case where a configuration in which a treatment liquid is applied to improve fixability of ink on the recording medium is adopted, information for determining whether to apply the treatment liquid is transmitted as a command.

According to the above-described commands, the image recording apparatus reads data necessary for recording from the ROM 105 and performs recording based on the data. The data necessary for recording includes, for example, the number of recording passes (the number of scans) in performing the above-described multipass recording, an amount of ink applied per unit area of the recording medium, and data for determining a recording direction. A type of a mask for data thinning applied in performing the multipass recording, and a drive condition based on a detection value of the temperature sensor in the recording head 9 (for example, a shape of a drive pulse applied to a beat generation unit, an application time, and the like) are also included. Further, data such as a dot size, a conveyance condition of the recording medium, the number of colors to be used, and a carriage speed may be included.

<Amount of Power Used Due to Difference in Environmental Temperature>

Next, an amount of power used due to a difference in the environmental temperatures is described, which is an issue according to the present exemplary embodiment. Here, two conditions of the environmental temperatures 28° C. and 13° C. are compared and described in detail.

Figure 5B:
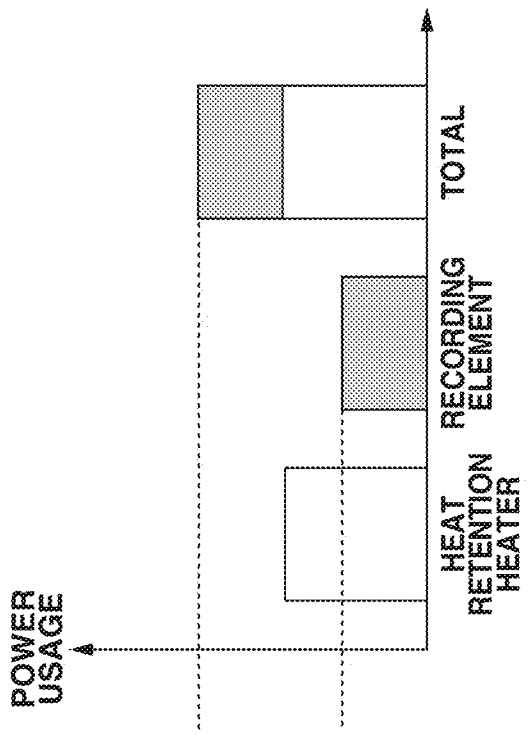
FIGS. 5A and 5B illustrate power usage of the recording head and power usage of a sub heater.
Figure 5A:
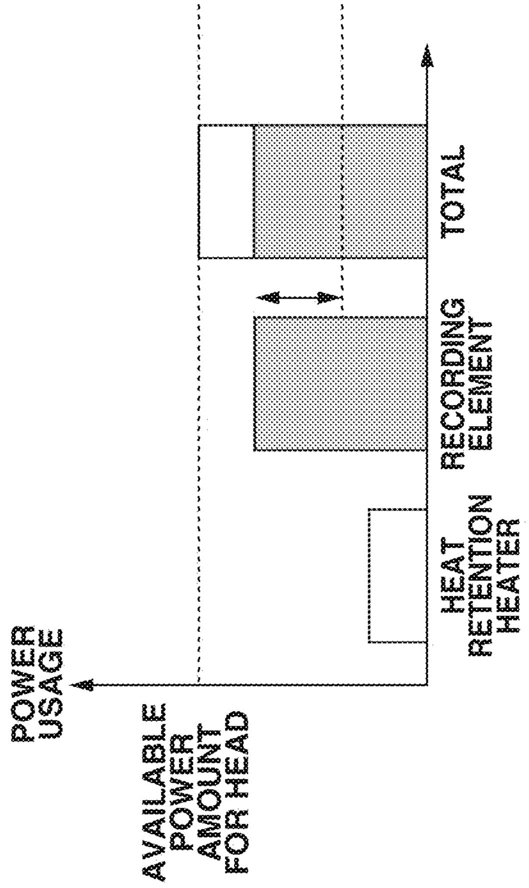

FIGS. 5A and 5B illustrate amounts of power used by a heat retention heater (sub-heater) and the recording element in a case where an image such as a poster that uses a lot of inks is recorded. Both are power supplied from the power supply unit 120. From the left, the amount of power used by the heat retention heater, the amount of power used to eject ink droplets by the recording element, and the total amount of power used by the heat retention heater and the recording element are illustrated. FIG. 5A illustrates the amounts of power used in a case where the environmental temperature is 28° C., and FIG. 5B illustrates the amounts of power used in a case where the environmental temperature is 13° C. In the drawing, an amount indicated by a dashed line is an amount of power available to the recording head.

If a target temperature of the recording head is 40° C., in the case of the environmental temperature of 28° C. in FIG. 5A, heating for the difference of 12° C. is required, and in the case of the environmental temperature of 13° C. in FIG. 5B, heating for the difference of 27° C. is required. In other words, in the case where the environmental temperature is 13° C., more than double the power is required to reach the target temperature compared with the case where the environmental temperature is 28° C.

On the other hand, the available power amount indicated by the dashed line is determined by the apparatus configuration, is constant, and does not change depending on the environmental temperature. Thus, the amount of power that can be used for ejecting ink droplets by the recording element is the amount obtained by subtracting the amount of power used by the heat retention heater from the available power amount indicated by the dashed line.

As described above, if the environmental temperature is different, the amount of power that can be used by the recording element is smaller as the difference from the target temperature is greater, and the amount of power that can be used by the recording element is greater as the difference from the target temperature is smaller. In actual recording, the amount of power used by the recording element varies depending on the recording data, but it is necessary to control a condition of the recording operation so that it falls within a range of the amount of power that can be used by the recording element. The control is, for example, to reduce the carriage speed, and to reduce an area to be recorded in one scan of the carriage. In a case where the amount of power that can be used by the recording element is set without considering the environmental temperature, it is necessary to determine the recording condition according to a case of the lowest environmental temperature. In this case, for example, in a case where the environmental temperature is 28° C., even though the heat retention heater uses less power and the power can be supplied to the recording element, the power indicated by an arrow in the drawing is not used, and a severe recording condition is set, so that throughput may be decreased. In contrast, according to the present exemplary embodiment, the amount of power used in the heat retention heater is considered based on the environmental temperature, and control is performed so that the recording element can fully use the available power amount. As a result, a decrease in throughput can be suppressed. According to the present exemplary embodiment, in addition to the above-described configuration, the number of driving times of the recording elements is calculated for each scan, and the carriage operation speed and the number of multipass are changed according to the number of driving times of the recording elements.

Figure 6:
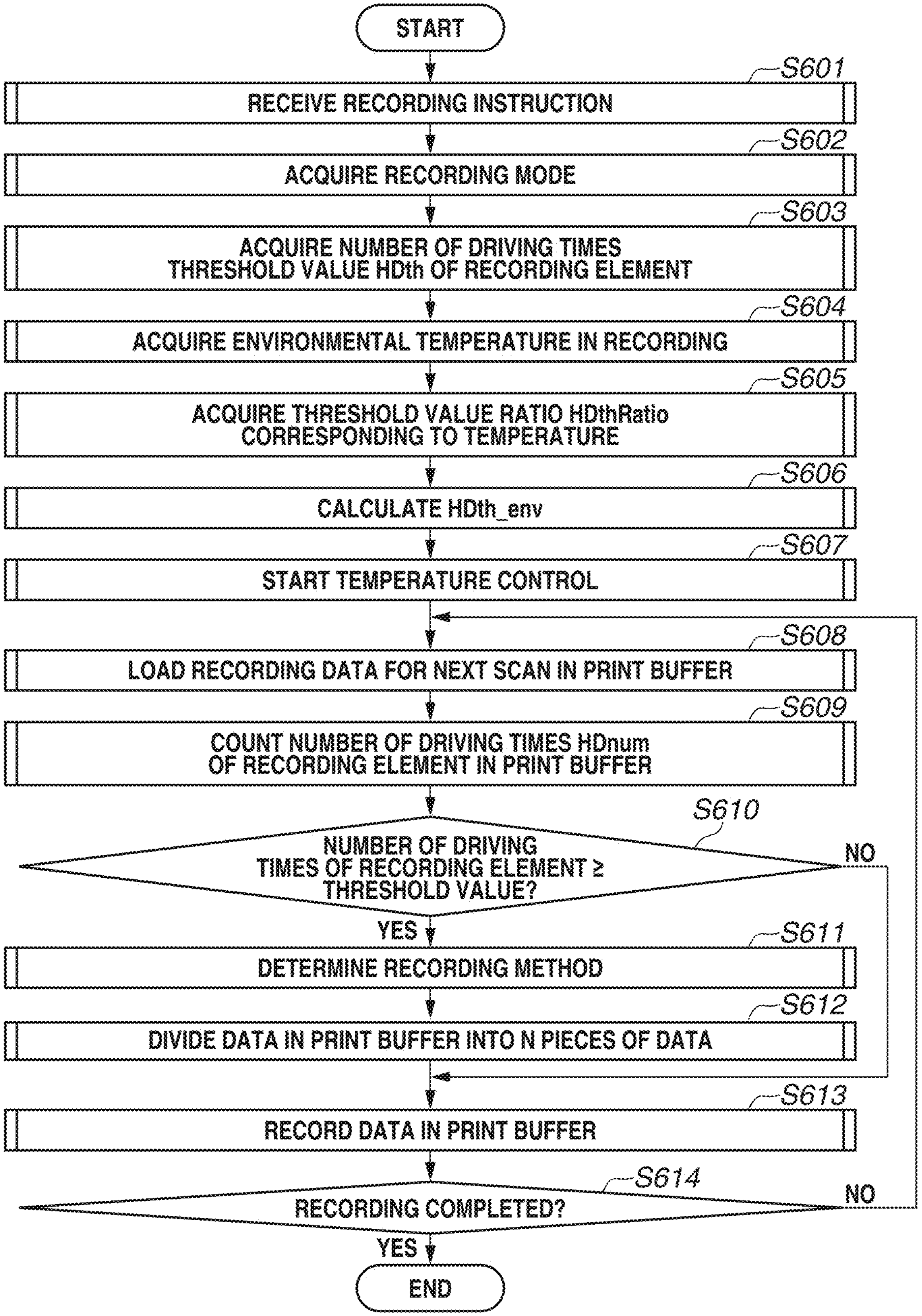
FIG. 6 is a flowchart illustrating recording control according to a first exemplary embodiment.

FIG. 6 is a flowchart illustrating each process in recording control according to the present exemplary embodiment. The control in the present flowchart is executed by the MPU 102 executing a program stored in the ROM 105

First, in step S601, a recording instruction is received from a user. Here, a processing flow is described on the assumption that the sheet type is set to "plain paper" and the recording quality is set to "standard" as the recording conditions.

In step S602, the recording instruction from the user is analyzed to acquire recording mode information. Here, FIG. 7A illustrates a recording mode table, and FIG. 7B illustrates a threshold value ratio parameter table corresponding to the environmental temperature. FIG. 7B is described in detail below.

In the recording mode table illustrated in FIG. 7A, details of control contents of the apparatus are defined based on the sheet type and the recording quality selected by the user. For example, information such as the number of pass divisions, the carriage speed, and a recording element number of driving times threshold value (hereinbelow referred to as HDth) are described. A recording mode is an internal parameter that defines detailed control in recording. In recent image recording apparatuses, various kinds of information such as image processing resolution, error diffusion type, and an ink type to be used are defined in various formats and set as recording conditions in order to meet individual preferences of users.

In step S603, the threshold value HDth corresponding to the recording mode acquired in step S602 is acquired. Here, assuming that the recording conditions set by the user are in plain paper and a standard mode, a value of "1152000" is acquired as the threshold value HDth.

Here, the threshold value HDth is described. It is assumed that the image recording apparatus according to the present exemplary embodiment has the apparatus configuration in which the number of recording elements is 512 nozzles per color, the number of ink colors is 4 colors of CMYK, a maximum possible recording width in the scanning direction (Y direction) is 10 inches, and the recording elements have driving resolution of 600 dpi. In a printer with this configuration, the maximum number of driving times of the recording elements (hereinbelow, the number of driving times of the recording elements are referred to as HDnum) within one scan is 512 nozzles×10 inches×600 dpi=307200 times per color. However, due to restrictions such as a power supply configuration of the apparatus and an allowable current amount of electric terminals or the like, an amount of current that can be actually applied to the recording head as a current for ejection is determined as the threshold value HDth. The threshold value HDth is set to a value corresponding to a movement speed of the carriage unit 2 (the carriage speed) on which the recording head 9 is mounted. This is because an average amount of current per unit time is a load on an electric circuit. In a case where a plurality of recording modes with different carriage speeds can be set, even if the number of dots ejected onto the recording medium P is the same, the number of driving times of the recording elements per unit time differs according to the carriage speed. Thus, the threshold value HDth is determined based on the number of driving times of the recording elements per unit time, and if a drive frequency is the same, the threshold value HDth is set so that the value of HDth is smaller as the carriage speed is faster and the value of HDth is greater as the carriage speed is slower. According to the present exemplary embodiment, the control is directed to suppressing excessive loads on the electrical element and the electrical circuit as describe above.

In step S604, temperature information indicating the environmental temperature at the start of recording is acquired. Here, a high temperature environment is assumed, and a room temperature is assumed to be 28° C. According to the present exemplary embodiment, the environmental temperature is acquired at a timing when a recording job is received in step S601. For example, in a case where a recording time is very long, or in a case where the room temperature is raised from a low temperature environment using air conditioning to warm the room, there may be a situation where the environmental temperature changes during the recording operation. In such a case, although the order is different from the present exemplary embodiment, the environmental temperature may be acquired for each scan, and the timing of acquiring the environmental temperature is not limited to the above-described configuration.

In step S605, based on the environmental temperature acquired step S604, a threshold value ratio HDthRatio is acquired according to the threshold value ratio parameter table corresponding to the environmental temperature illustrated in FIG. 7B. In the threshold value ratio parameter table corresponding to the environmental temperature, the threshold value ratio HDthRatio, which is a weighting factor, is set to increase as the environmental temperature is higher. This is because the amount of power required for heat retention using the sub heater is smaller as the environmental temperature is higher, so that the amount of power that can be used for ejection from the recording head 9 can be increased. Here, the threshold value ratio HDthRatio of 1.2 is acquired corresponding to the environmental temperature of 28 degrees acquired in step S604.

In step S606, a number of driving times threshold value HDth_env corresponding to the environmental temperature is calculated. The number of driving times threshold value HDth_env is calculated by multiplying the threshold value HDth corresponding to the recording mode acquired in step S603 by the threshold value ratio HDthRatio acquired in step S605.

In step S607, temperature control is started. For the temperature control, the sub heaters provided in the recording head 9 illustrated in FIGS. 2A, 2B, and 2C are used to heat until the temperature sensors S6 to S9 reach a target value. According to the present exemplary embodiment, even after reaching the target temperature, heating control (heat retention control) is continued to be able to maintain the target temperature as long as there is recording data. Here, a case where the target temperature is constant is described, but the target temperature may be changed according to an ink color or the environmental temperature.

The configuration according to the present exemplary embodiment includes a plurality of temperature sensors for one recording head, but a head temperature used for determination may be, for example, an average temperature or a maximum temperature of the plurality of temperature sensors, or a weighted temperature. Here, the average value of temperatures acquired by the plurality of temperature sensors is used as the head temperature, but it is not limited to this value. For example, in a case where an image is recorded in a monochrome mode, it can be changed as appropriate, such as using a weighting coefficient that increases a ratio of the temperature sensor that exists near the recording element array of black ink.

Here, the temperature control necessary for stable ejection is described. In a case where ink droplets are not ejected from the recording element during one scan, water evaporates from the droplet on an ejection port surface, and ink viscosity rises locally. The rise of the ink viscosity makes it difficult to eject the ink droplet, or shifts a landing position of the ejected ink droplet. On the other hand, the ink viscosity can be reduced by control to heat or to maintain the temperature of the recording head. Thus, the temperature control is performed to beat the recording head to the target temperature before starting scanning. The target temperature at this time is set to a temperature that will ensure stable ejection even at a timing when one scan is completed. The target temperature can be set appropriately according to the head configuration and an ink physical property, and is set to 40° C. according to the present exemplary embodiment.

In step S608, the recording data for a next scan is loaded in the print buffer 121. In the print buffer 121, the recording data is loaded in a band-shaped memory area corresponding to a vertical size of 512 recording elements and a horizontal size of an image recordable width in the Y direction of 10 inches×600 dpi=6000 for one ink color. In other words, recording data corresponding to the number of ink colors is loaded.

Here, a method for converting red-green-blue (RGB) image data, which is general input data, into recording data corresponding to each ink color is described. Here, a form using four colors of CMYK ink is described.

Figure 8:
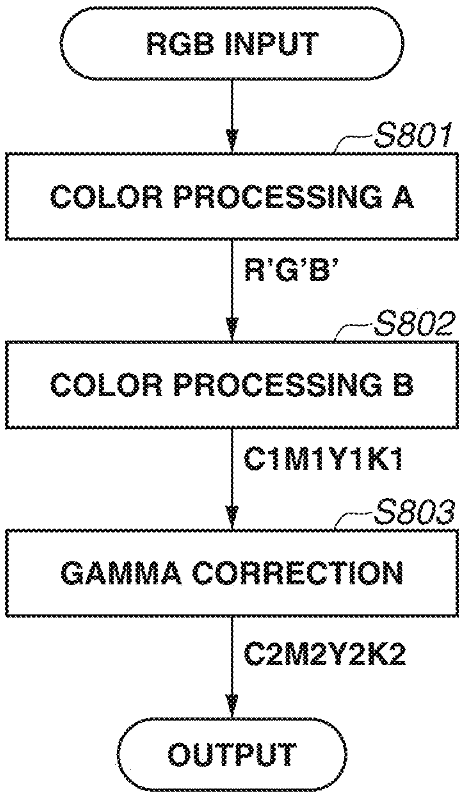
FIG. 8 is a flowchart illustrating image data processing.

FIG. 8 is a flowchart illustrating image processing in the image recording apparatus according to the present exemplary embodiment. In step S801, RGB original image signals acquired by an image input device, such as a digital camera or a scanner, or computer processing are converted into R'G'B' signals by color processing A. According to the present exemplary embodiment, multivalued image data has input resolution of 600 dpi×600 dpi, and is luminance data (R, G, B) expressed by 8 bits or 256 gradations per pixel. The color processing A is processing for converting the original image signals RGB into the image signals R'G'B' adapted to a color reproduction range of the recording apparatus.

In step S802, the R'G'B' signals are converted into signals corresponding to each color ink by color processing B. Here, multivalued output data of each ink color is converted into data expressed by 12 bits or 4096 gradations per pixel with resolution of 600 dpi×600 dpi. Here, the signals after conversion are density signals C1, M1, Y1, and K1 respectively corresponding to four colors of cyan, magenta, yellow, and black. In the color processing B, output values are determined using a three-dimensional lookup table (3D LUT) of R, G, B inputs and C, M, Y, K outputs, but for an input value outside a grid point, an interpolation operation is performed using output values of surrounding grid points.

In step S803, gamma correction is performed on the density signals C1, M1, Y1, and K1 using a correction table to acquire signals C2, M2, Y2, and K2. Here, 12-bit data with the resolution of 600 dpi×600 dpi for each color is converted into 8-bit-256-gradation data.

By the image processing flow as described in steps S801 to S803, recording data corresponding to each ink color is generated.

Returning to FIG. 6, in step S609, the data in the print buffer loaded in step S608 is analyzed, and the number of driving times HDnum of the recording element is counted. According to the present exemplary embodiment, a value obtained by summing the number of driving times of four colors of CMYK is treated as the number of driving times HDnum.

In step S610, the number of driving times HDnum calculated in step S609 is compared with the number of driving times threshold value HDth_env calculated in step S606 to determine whether it is the number of driving times threshold value HDth_env or more. In a case where it is determined that the number of driving times HDnum is the number of driving times threshold value HDth_env or more (YES in step S610), the processing proceeds to step S611, whereas in a case where the number of driving times HDnum is less than the number of driving times threshold value HDth_env (NO in step S610), the processing proceeds to step S613.

In step S611, a recording method is determined. Since the number of driving times HDnum is the number of driving times threshold value HDth_env or more, it is necessary to reduce power consumption per unit time. FIG. 9 illustrates a table for setting the recording method. In the setting table illustrated in FIG. 9, the recording methods corresponding to the recording modes such as the sheet type and the recording quality are set. The recording method set here is a recording method that consumes less power per unit time than the recording method that is executed in a case where the processing proceeds to step S613, that is, a case where the number of driving times HDnum is less than the number of driving times threshold value HDth_env.

A threshold value ratio DownTh1 indicates a ratio to the number of driving times threshold value HDth_env. The number of driving times threshold value HDth_env is multiplied by the threshold value ratio, and the multiplied value is compared with the number of driving times HDnum. According to the present exemplary embodiment, comparison is performed using a plurality of values as the threshold value ratio. Accordingly, an approximate ratio of the number of driving times HDnum to the number of driving times threshold value HDth_env can be estimated, and an appropriate recording method can be determined.

Figure 10:
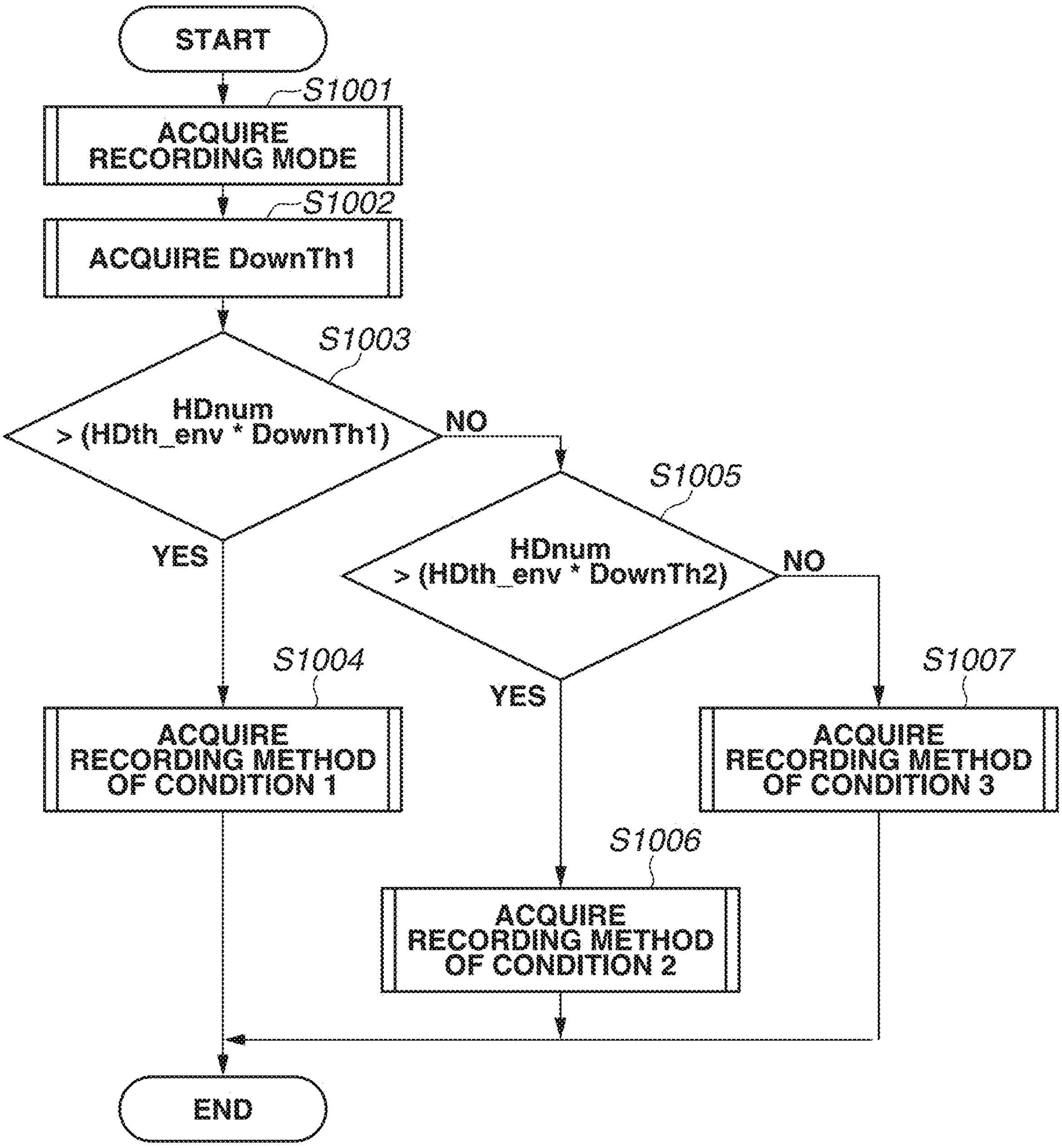
FIG. 10 is a flowchart illustrating data processing in a plurality of conditions in reducing a power consumption amount.

FIG. 10 is a flowchart illustrating processing for determining the recording method using the threshold value ratio. In step S1001, information about the recording mode acquired in step S602 is acquired. In step S1002, values of the threshold ratio DownTh1 of a condition 1 and a threshold ratio DownTh2 of a condition 2 are acquired from the table in FIG. 9 based on the acquired recording mode.

In step S1003, a multiplied value of the number of driving times threshold value HDth_env and the value of the threshold value ratio DownTh1 of the condition 1 is calculated, and it is determined whether the value of the number of driving times HDnum is greater than the multiplied value. For example, the value of the threshold value ratio DownTh1 is two in a case of plain paper and the standard mode. Thus, in the determination, it is determined whether the value of the number of driving times HDnam is greater than twice the number of driving times threshold value HDth_env. In a case of YES in step S1003, in other words, it is more than twice the number of driving times threshold value HDth_env, the processing proceeds to step S1004, whereas in a case of NO in step S1003, in other words, it is twice the number of driving times threshold value HDth_env or less, the processing proceeds to step S1005.

In step S1004, the recording method corresponding to the condition 1 is acquired from the table in FIG. 9. Since it is determined in step S1003 that the value of the number of driving times HDnum is greater than twice the number of driving times threshold value HDth_env (the condition 1), it is necessary to reduce the power consumption per unit time of the recording method to half or less compared with a case where the value of the number of driving times HDnum is less than the threshold value. Thus, the recording method is set in which the carriage speed during scanning is 0.6 times the standard speed and the recording data for the next scan is recorded by being divided in two parts.

Here, a method for recording in two divisions is described with reference to FIGS. 11A and 11B. In the drawings, the horizontal direction is the scanning direction of the recording head 9 (the Y direction), and the vertical direction is the direction in which the recording elements are arranged (the X direction). Here, an image that is recorded in one scan is illustrated, and a length in the vertical direction corresponds to a length that the recording head 9 can record in one scan, that is, a width in which the recording elements are arranged. In the drawings, only one array of the recording element array in the recording head is illustrated.

Figure 11A:
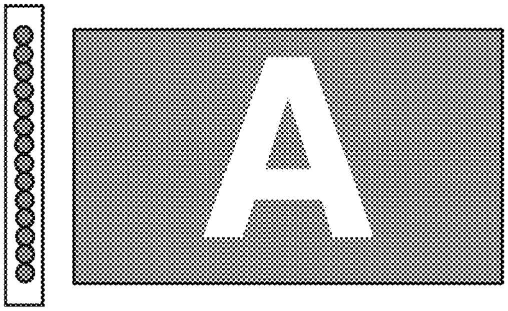
FIG. 11A illustrates division recording.
Figure 11B:
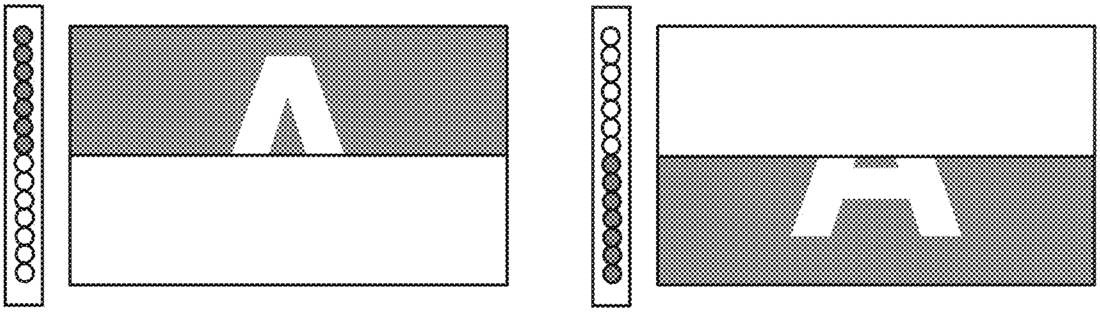
FIG. 11B illustrates division recording.

FIG. 11A illustrates a case of recording without division and illustrates an image recorded by one scan using all the recording elements arranged in the recording head. FIG. 11B illustrates an image recorded with two scans in two divisions. The 512 recording elements arranged in the recording head 9 are divided into upper and lower halves, recording is performed using the first to 256th recording elements in the upper half in the first scan, and recording is performed using the 257th to 512th recording elements in the lower half in the second scan. Thus, the number of recording elements that eject ink droplets in one scan is limited, and the amount of power consumed per unit time in the recording head 9 can be suppressed. As a division method, a method for thinning out recording data using a mask pattern may be used.

Returning to FIG. 10, in step S1003, in a case where the condition 1 is not met, in other words, the value of the number of driving times HDnum is twice the number of driving times threshold value HDth_env or less (NO in step S1003), the processing proceeds to step S1005. In step S1005, a multiplied value of the number of driving times threshold value HDth_env and the value of the threshold value ratio DownTh2 of the condition 2 is calculated, and it is determined whether the value of the number of driving times HDnum is greater than the multiplied value. The value of the threshold value ratio DotwnTh2 is 1.5 in the case of plain paper and the standard mode. Thus, in the determination, it is determined whether the value of the number of driving times HDnum is greater than 1.5 times the number of driving times threshold value HDth_env. In a case where the value of the number of driving times HDnum is greater than 1.5 times the number of driving times threshold value HDth_env (YES in step S1005), the processing proceeds to step S1006, whereas in a case where the value of the number of driving times HDnum is 1.5 times the number of driving times threshold value HDth_env or less (NO in step S1005), the processing proceeds to step S1007.

In step S1006, the recording method corresponding to the condition 2 is acquired from the table in FIG. 9. Since it is determined in step S1005 that the value of the number of driving times HDnum is greater than 1.5 times and less than or equal to twice the number of driving times threshold value HDth_env (the condition 2), it is necessary to reduce the power consumption per unit time of the recording method to two-thirds or less compared with the case where the value of the number of driving times HDnum is less than the threshold value. Thus, the recording method is set in which the carriage speed during scanning is 0.6 times the standard speed.

In a case where neither condition 1 nor condition 2 is met (NO in step S1005), the processing proceeds to step S1007, and the recording method of a condition 3 is acquired. Since it is determined in step 1005 that the value of the number of driving times HDnum is greater than the number of driving times threshold value HDth_env and less than or equal to 1.5 times the number of driving times threshold value HDth_env (the condition 3), the recording method is set in which the carriage speed during scanning is 0.8 times the standard speed.

In this way, in step S611, the recording condition is set according to the ratio of the number of driving times HDnum to the number of driving times threshold value HDth_env. At this time, in a case where the number of driving times HDnum is greater than the number of driving times threshold value HDth_env, the recording condition is set in which a power consumption amount per unit time is less than that in a case where the number of driving times HDnum is less than the number of driving times threshold value HDth_env. Accordingly, an image can be recorded within a predetermined power consumption range.

A setting method of the recording method is not limited to the setting method according to the present exemplary embodiment. For example, the power consumption amount can be reduced by calculating a ratio of the value of the number of driving times HDnum to a reference value and changing the carriage speed based on a reciprocal of the ratio. In addition, the number of divisions of recording data may be increased to three or four. As in a case of a fine mode of plain paper, there may be a form in which the condition 2 is not defined. In this case, the processing proceeds to step S1007 without performing determination and branching in step S1005 to set the recording method.

Returning to FIG. 6, in step S612, data in the print buffer is regenerated. In a case where the recording method for division recording is set in step S611, recording data corresponding to division recording is generated in the print buffer. According to the present exemplary embodiment, the number of divisions is two, and as described with reference to FIGS. 11A and 11B, data for one scan is divided into two pieces of data to generate recording data for two scans.

In step S613, an image is recorded on the recording medium based on the recording data in the print buffer. In a case where the data divided in step S612 is regenerated, an image is recorded by N scans based on the recording data for N scans corresponding to the number N of divisions. Further, in a case where the carriage speed is set to be changed in the recording method set in step S611, the carriage unit 2 is controlled based on the set recording condition.

In step S614, it is determined whether recording is completed. In a case where recording is not completed and recording data still remains (NO in step S614), the processing returns to step S608, recording data for one scan is generated, and recording processing continues.

By the above-described processing, the amount of power per unit time that can be used for ejecting ink from the recording head can be set according to the environmental temperature. This configuration can efficiently distribute the power used by the sub heater to maintain the temperature of the recording bead and the power used by the recording head for ink ejection and contribute to improve usability while suppressing a decrease in throughput.

The control according to the present exemplary embodiment is particularly effective in a case where the power supply for supplying power to the recording element and the power supply for supplying power to the sub-heater are treated as one power supply capacity. This is because electrical components such as a substrate, wiring, and a power supply require control to keep an instantaneous amount of applied current and an average amount of applied current less than or equal to a predetermined threshold value. On the other hand, even if the power supply for the recording element and the power supply for the sub heater are separately configured, it can be necessary to reduce the amount of power such as the maximum amount of power in the normal operation of the image recording apparatus. In such a case, the configuration according to the present exemplary embodiment can be applied. For example, a configuration may not include a sub heater for heat retention of the recording head. The temperature control of the recording head can also be performed by applying a pulse to the recording element, which is an electrothermal conversion element, to such an extent that ink droplet is not ejected, in addition to the form using the sub heater. Even in this form, the premise is the same that the amount of power that can be used for heat retention of the recording head differs depending on the environmental temperature, so that a similar effect can be acquired by applying the above-described configuration according to the present exemplary embodiment.

In the recording head according to the present exemplary embodiment, the sub heaters are arranged to surround an outer periphery of the recording element substrate 10, but various layouts, such as wiring along the recording element array, are conceivable without being limited to this form.

According to the present exemplary embodiment, the threshold value ratio HDhRatio described in the threshold value ratio parameter table corresponding to the environmental temperature in FIG. 7B is changed only by the environmental temperature regardless of the recording mode, but may be changed in consideration of other factors. For example, the carriage speed is not the same for a plurality of recording modes, so that the threshold value ratio HDhRatio may be set in consideration of the carriage speed set for each recording mode. In addition, the type of ink and the number of inks used can differ depending on the recording mode, such as a monochrome mode or a color mode, so that the threshold value ratio parameter table may be extended to be provided for each recording mode, and a value for each recording mode to be used may be used.

Further, in recent image recording apparatuses, an apparatus including an ink circulation mechanism and an apparatus including an ink temperature control device are also conceivable. These apparatuses may acquire a temperature of ink flowing into the recording head and use it for determination as the environmental temperature. In a case where the recording operation is not performed for a certain period of time or more, the temperature of the recording head 9 is considered to be approximately equal to the temperature in the installation environment of the recording apparatus. Thus, in this condition, the temperature acquired by the temperature sensors S6 to S9 may be used as the environmental temperature according to the present exemplary embodiment. In this case, it is desirable not to acquire the environmental temperature for each scan, but to continue to use the temperature acquired before the start of the recording operation as the environmental temperature.

According to the present exemplary embodiment, in step S609 in FIG. 6, the number of driving times HDnum of the recording element is counted based on multivalued data of 256 gradations, but the present invention is not limited to this form. The multivalued data of 256 gradations is quantized, and thus, quantized data indicating whether ink is actually ejected from the recording elements is generated, but the number of driving times HDnum may be counted based on the quantized data. Further, the present invention is not limited to the form that counts the number of driving times of the recording elements and may be a form that acquires a dot count value and compares the dot count value with the threshold value and a form that compares a value acquired from data indicating an applied amount of ink of each color with the threshold value.

The present invention is not limited to a serial recording type recording apparatus like the image recording apparatus according to the present exemplary embodiment, and can also be applied to a so-called full multi-type image recording apparatus in which a recording medium is conveyed with respect to a fixed recording head. In a case of the full multi-type, one recording head may include a plurality of ink colors, or a recording head may be provided for each ink color. Further, according to the present exemplary embodiment, the recording method is determined by counting the number of driving times of the recording elements for each scan, but the recording method may be determined by counting the number of driving times of the recording elements based on, for example, a page unit in a case of a cut paper or a separator of a predetermined unit in a case of roll paper. In a full multi-type image processing apparatus, the power consumption per unit time can be suppressed by slowing down a conveyance speed of the recording medium.

According to the present exemplary embodiment, the amount of power used for heat retention of the recording head is described as power required in addition to the amount of power used to eject ink, but the power for another configuration may be considered. In a case of an image recording apparatus equipped with a fixing mechanism in order to cope with recent versatile uses, as with the sub heater for heat retention, a parameter such as HD_Ratio may be set in consideration of the power consumption of the fixing mechanism. In such a product form, an apparatus is common that can set a fixing temperature in a the fixing unit. In order to correspond to the application, the HD_Ratio can be set in consideration of a setting temperature in the fixing unit.

Second Exemplary Embodiment

According to the above-described exemplary embodiment, the control is adopted to suppress the amount of power used per unit time by performing division recording and reducing the carriage speed based on the total number of driving times of the recording elements in one scan. On the other hand, depending on the type of recording element, it may be necessary to consider an instantaneous current in a further shorter period than the amount of power in the period of one scan. In such a case, in addition to the total number of driving times for recording data in one scan, the area of one scan is further divided into narrower areas, and control of the amount of power per unit time is required based on the number of driving times for each area. According to the present exemplary embodiment, drive control is described that considers an instantaneous current in a divided area smaller than one scanning area.

Figure 12:
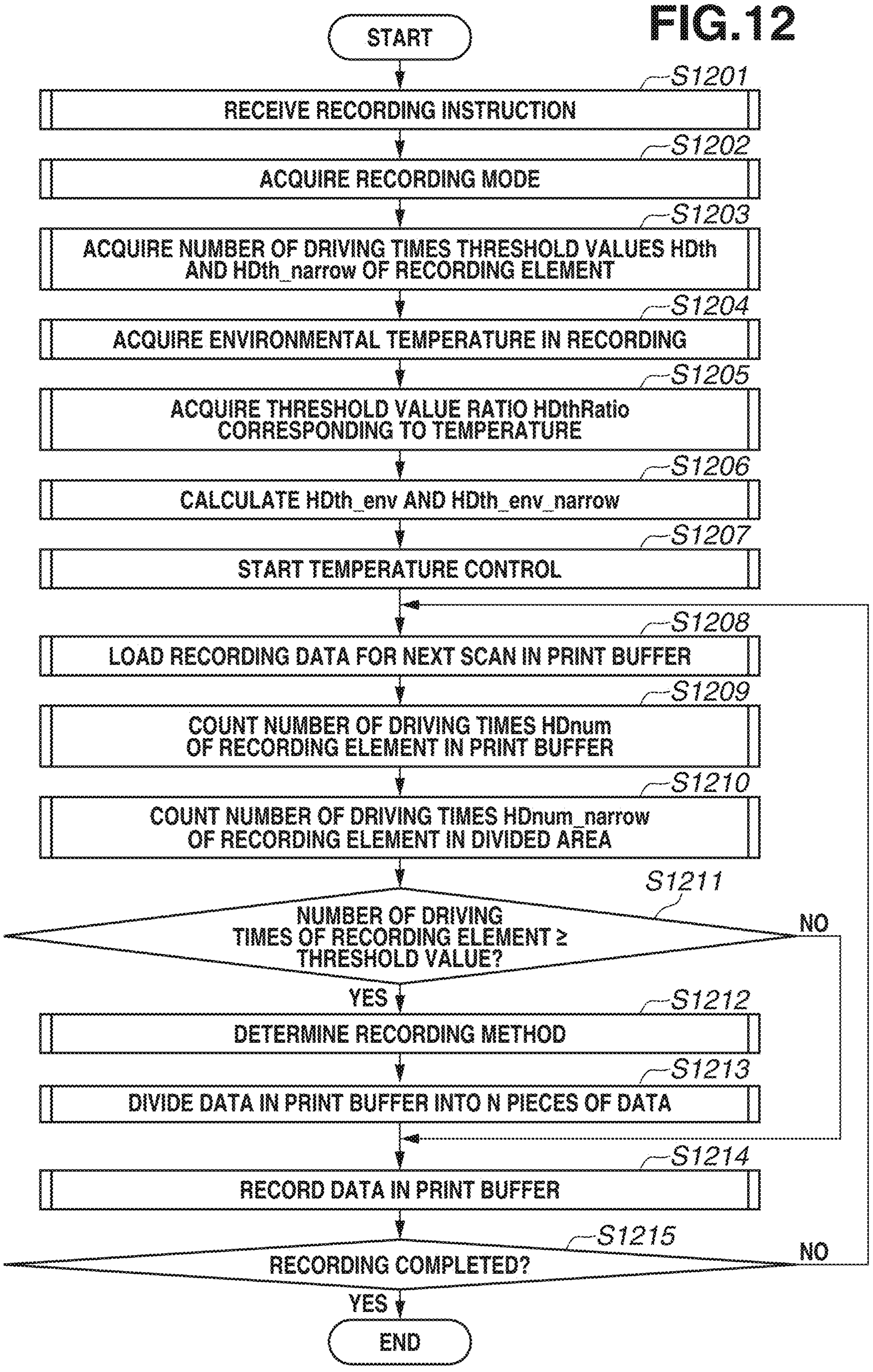
FIG. 12 is a flowchart illustrating recording control according to a second exemplary embodiment.

FIG. 12 is a flowchart illustrating each process in recording control according to the present exemplary embodiment. Descriptions of points that overlap with the processes in FIG. 6 according to the first exemplary embodiment are omitted.

Processing in steps S1201 and S1202 is the same as that in steps S601 and S602, so that the description thereof is omitted.

In step S1203, the number of driving times threshold value HDth corresponding to the recording mode acquired in step S1202 and a number of driving times threshold value HDth_narrow in a small divided area is acquired. Similar to FIG. 7A, FIG. 13A illustrates a table in which the number of driving times threshold value HDth corresponding to each recording mode is set, and, further, a value of the threshold value HDth_narrow used for comparison with the number of driving times in the divided area is added thereto. FIG. 13B is the same as FIG. 7B, so that the description thereof is omitted. Here, a case where plain paper and the standard mode are set is described as an example. As the number of driving times threshold value corresponding to the plain paper and the standard mode, the threshold value HDth for one scan=1152000 and the threshold value HDth_narrow for the divided area=57600 are acquired.

Processing in steps S1204 and S1205 is similar to that in steps S604 and S605, so that the description thereof is omitted.

In step S1206, two values of the number of driving times threshold value HDth_env and a threshold value HDth_env_narrow for the divided area corresponding to the environmental temperature are calculated. A calculation method is similar to that in step S606, and the threshold values HDth and HDtb_narrow are each multiplied by the threshold value ratio HDthRatio.

Processing in steps S1207 to S1209 is similar to that in steps S607 to S609, so that the description thereof is omitted.

In step S1210, the number of driving times of the recording elements in the divided area is counted. In step S1209, the number of driving times of the recording elements is counted based on the recording data for one scan, but, here, the number of driving times of the recording elements is counted for each divided area, and a maximum count value is regarded as the number of driving times HDnum_narrow in the divided area.

Figure 14A:
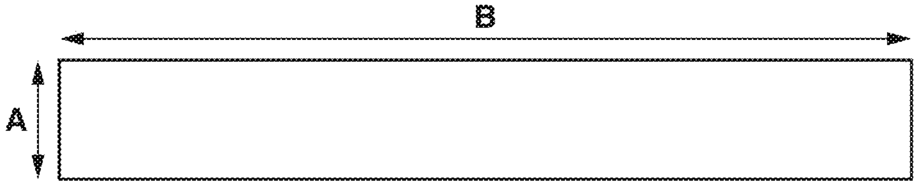
FIG. 14A illustrates an area for calculating the number of driving times of a recording element.
Figure 14B:
FIG. 14B illustrates an area for calculating the number of driving times of the recording elements.
Figure 14C:
FIG. 14C illustrates an area for calculating the number of driving times of the recording elements.

FIGS. 14A, 14B, and 14C illustrate a print buffer for one scan of a certain ink color. According to the present exemplary embodiment, the number of recording elements A is 512 nozzles, and a scan width B is 10 inches×600 dpi=6000 memory areas. FIG. 14A illustrates an entire scan, FIG. 14B illustrates a count of the number of driving times for the first time in the divided area, and FIG. 14C illustrates a count of the number of driving times for the second time in the divided area. A width of the divided area in a recording element arrangement direction is 512 nozzles, which is the same as that of the area of one scan.

In step S1209, first, the number of driving times in the area for one scan illustrated in FIG. 14A is counted. Next, the number of driving times in the divided area indicated by a dashed line in FIG. 14B is counted. Next, the number of driving times in the divided area indicated by a dashed line in FIG. 14C is counted. As illustrated in FIGS. 14B and 14C, the divided area counted in the first time and the divided area counted in the second time are set to partially overlap with each other. The number of driving times is counted while shifting the divided areas in this way, and a maximum value in one scanning area is calculated. The maximum value is determined as the number of driving times HDnum_narrow in the divided areas. Here, the print buffer for one color is described, but practically, the print buffer for four colors of CMYK may be loaded at the same time, and HDnum_narrow may be determined by a total value of four colors. In a case where the number of driving times of four colors are summed, even in the same pixel on the recording medium, the recording element arrays are physically shifted, so that the ejection timings are not the same on an absolute time axis and are slightly deviated. In consideration of this deviation, a more suitable form can be realized by, for example, calculating the total value by taking into consideration the amount of deviation in the ejection timing based on a distance between the recording element arrays.

In step S1211, it is determined whether the number of driving times is the threshold value or more. Specifically, it is determined whether the number of driving times HDnum in one scanning area is the number of driving times threshold value HDth_env in one scanning area or more, and it is determined whether the number of driving times HDnum_narrow in the divided area is the number of driving times threshold value HDth_env_narrow in the divided area or more. In a case where it is determined as the threshold value or more (YES in step S1211), the processing proceeds to step S1212, whereas it is determined as less than the threshold value (NO in step S1211), the processing proceeds to step S1214.

In step S1212, the recording method is determined. A determination method is similar to that in step S611. The processing in step S611 is similarly performed for the number of driving times HDnum_narrow in the divided area. In a case where the conditions of the recording methods determined by the number of driving times HDnum in one scan and the number of driving times HDnum_narrow in the divided area are different, the one with the smaller condition number can be selected. For example, in a case where the recording method determined by HDnum is the condition 2, and the recording method determined by HDnum_narrow is the condition 1, the recording method of the condition 1 is selected.

Subsequently, processing in steps S1213 to S1215 is similar to that in steps S612 to S614, so that the description thereof is omitted.

In this way, even for the divided area smaller than the one scanning area, the number of driving times of the recording elements is counted and compared with the threshold value, so that it is possible to suppress a decrease in throughput even in a case where an electric element having weak withstand voltage performance in an instantaneous short period of time is used.

According to the present exemplary embodiment, the configuration is described in which the same recording method is selected in the one scanning area and the divided area, but the recording method may not be the same. The recording method may be set individually. Further, according to the above-described exemplary embodiment, the recording method is determined by comparing the one scanning area and the divided area with the threshold values, but the recording method may be determined only by comparison of the divided area. A size of the divided area is not limited to the above-described example, and the width in the X direction may be shorter than the width of one scan.

The present invention is not limited to the above embodiments and various changes and modifications can be made within the spirit and scope of the present invention. Therefore, to apprise the public of the scope of the present invention, the following claims are made.

According to the present invention, a recording condition can be determined based on a temperature in an installation environment of a recording apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A recording apparatus that records an image on a recording medium by applying an ink droplet thereto, the recording apparatus comprising:

an acquisition unit configured to acquire a temperature in an installation environment of the recording apparatus;

a recording head provided with a plurality of recording elements to be driven by application of electrical energy;

a scanning unit configured to cause the recording head to relatively scan a recording medium;

a setting unit configured to set a threshold value corresponding to the temperature acquired by the acquisition unit in response to a recording instruction;

a calculation unit configured to calculate a value related to driving of the plurality of recording elements for applying ink droplets to a predetermined area in one relative scan based on the recording instruction;

a determination unit configured to determine a recording condition for recording an image based on the threshold value set by the setting unit and the value related to driving calculated by the calculation unit; and a control unit configured to control the recording head and the scanning unit based on the recording condition determined by the determination unit, wherein the setting unit further sets a threshold value corresponding to a second area having a size smaller than that of the predetermined area corresponding to the temperature acquired by the acquisition unit, wherein the calculation unit further calculates a second value related to driving of the plurality of recording elements for applying ink droplets in the second area having the size smaller than that of the predetermined area, and wherein the determination unit determines the recording condition further based on the threshold value corresponding to the second area and the second value related to driving.

2. The recording apparatus according to claim 1, wherein, in a case where the temperature acquired by the acquisition unit is a first temperature, the setting unit sets a first threshold value, and in a case where the temperature acquired by the acquisition unit is a second temperature higher than the first temperature, the setting unit sets a second threshold value greater than the first threshold value.

3. The recording apparatus according to claim 2, wherein, in a case where the temperature acquired by the acquisition unit is a third temperature higher than the second temperature, the setting unit sets a third threshold value greater than the second threshold value.

4. The recording apparatus according to claim 1, wherein, (i) in a case where the value related to driving is less than the threshold value set by the setting unit, the determination unit determines the recording condition as a first recording condition in which an amount of power that can be used per unit time to eject ink droplets from the plurality of recording elements is a first amount, and (ii) in a case where the value related to driving is greater than the threshold value set by the setting unit, the determination unit determines the recording condition as a second recording condition in which an amount of power that can be used per unit time to eject ink droplets from the plurality of recording elements is a second amount less than the first amount.

5. The recording apparatus according to claim 4, wherein a speed of relative scan in the second recording condition is slower than a speed of relative scan in the first recording condition.

6. The recording apparatus according to claim 4, wherein the number of relative scans for applying ink droplets to the predetermined area in the second recording condition is greater than the number of relative scans for applying ink droplets to the predetermined area in the first recording condition.

7. The recording apparatus according to claim 1, wherein the value related to driving calculated by the calculation unit is any one of the number of driving times of driving the plurality of recording elements, a dot count value, and a value acquired from data indicating an application amount of ink of each color.

8. The recording apparatus according to claim 1, further comprising a heater configured to heat the recording head.

9. The recording apparatus according to claim 8, wherein a power supply for supplying power to the plurality of recording elements and a power supply for supplying power to the heater have a common configuration.

10. The recording apparatus according to claim 1, wherein the recording head includes a plurality of recording element arrays corresponding to a plurality of colors of ink, and wherein a value related to driving calculated by the calculation unit is a total value in the plurality of colors of ink.

11. The recording apparatus according to claim 1, wherein the plurality of recording elements is arranged in a first direction, and the scanning unit performs a relative scan in a second direction intersecting the first direction.

12. The recording apparatus according to claim 11, further comprising a conveyance unit configured to convey a recording medium in the first direction, wherein the scanning unit causes the recording head to scan in the second direction.

13. A method for controlling a recording apparatus that includes a recording head provided with a plurality of recording elements to be driven by application of electrical energy and a scanning unit configured to cause the recording head to relatively scan a recording medium, the method comprising:

acquiring a temperature in an installation environment of the recording apparatus;

setting a threshold value corresponding to the acquired temperature in response to a recording instruction;

calculating a value related to driving of the plurality of recording elements for applying ink droplets to a predetermined area in one relative scan based on the recording instruction;

determining a recording condition for recording an image based on the set threshold value and the calculated value related to driving;

controlling the recording head and the scanning unit based on the determined recording condition;

setting a threshold value corresponding to a second area having a size smaller than that of the predetermined area corresponding to the acquired temperature; and calculating a second value related to driving of the plurality of recording elements for applying ink droplets in the second area having the size smaller than that of the predetermined area, wherein the determining determines the recording condition further based on the threshold value corresponding to the second area and the second value related to driving.

14. A non-transitory computer-readable storage medium storing a program for causing a computer to execute the method according to claim 13.

* * * * *